No. 892,148. PATENTED JUNE 30, 1908.
A. H. GELTZ & L. L. HOSACK.
AIR BRAKE APPARATUS.
APPLICATION FILED DEC. 6, 1906.
4 SHEETS—SHEET 3.
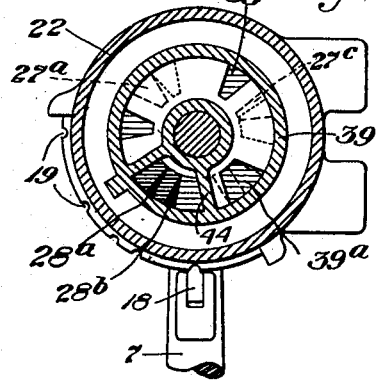
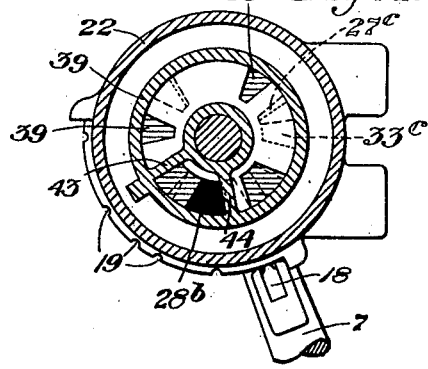
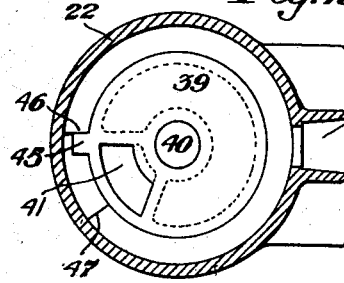
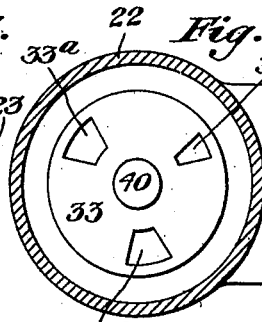
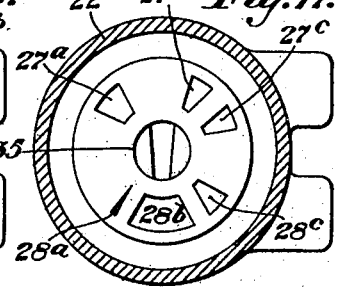
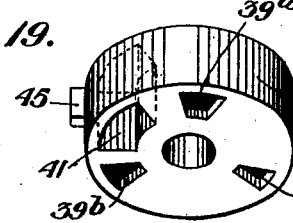
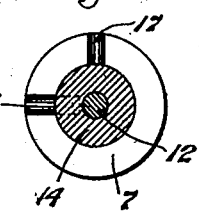
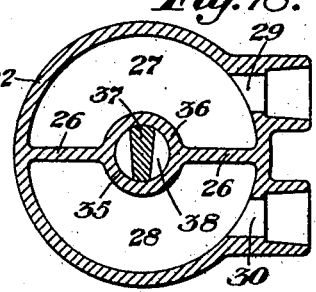
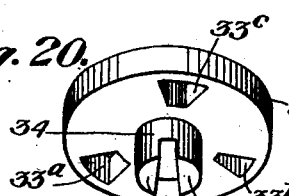
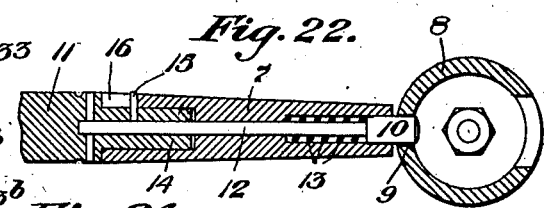
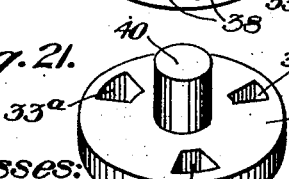
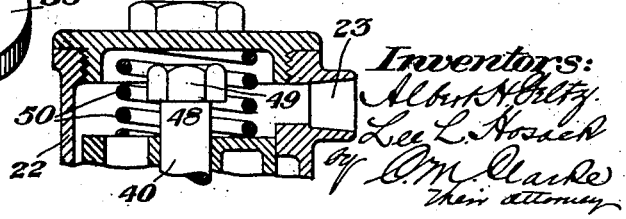

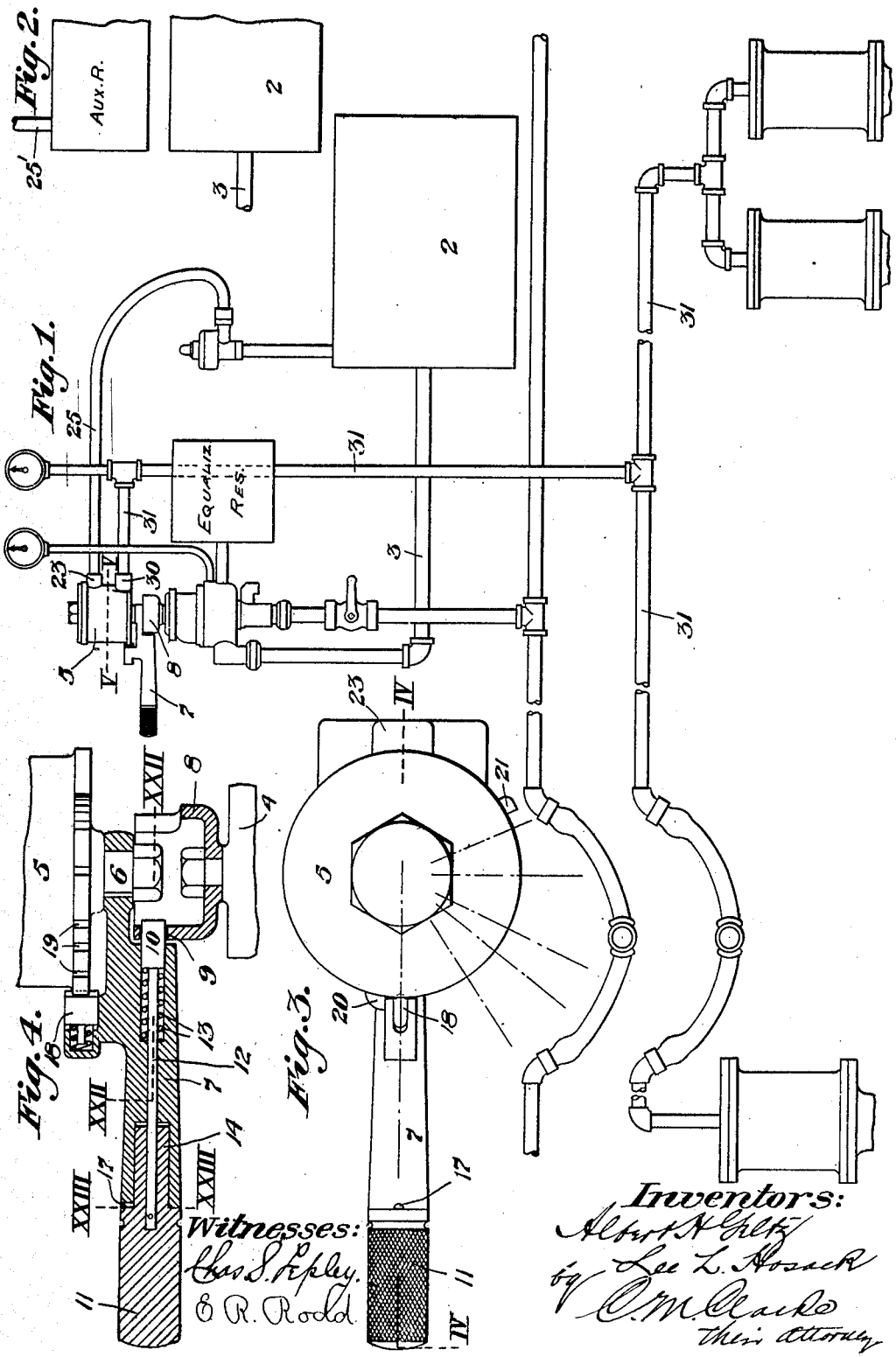

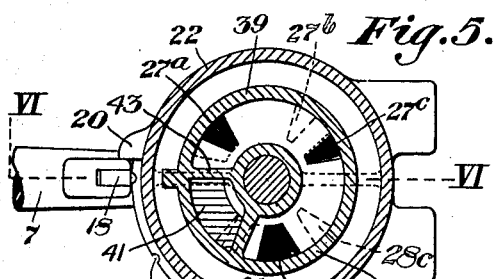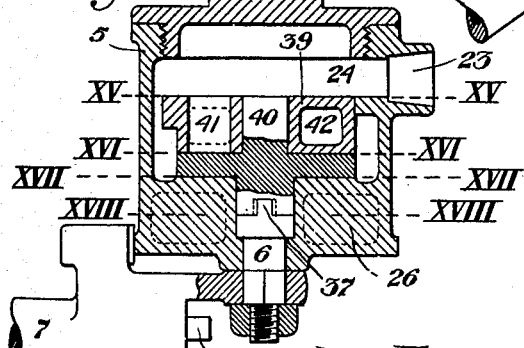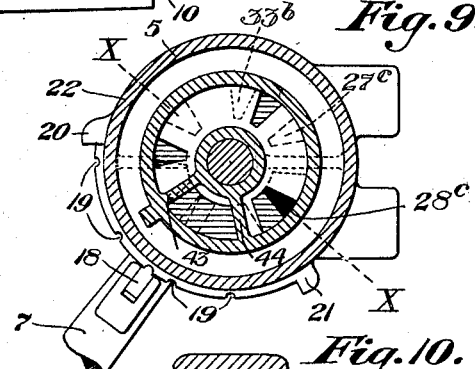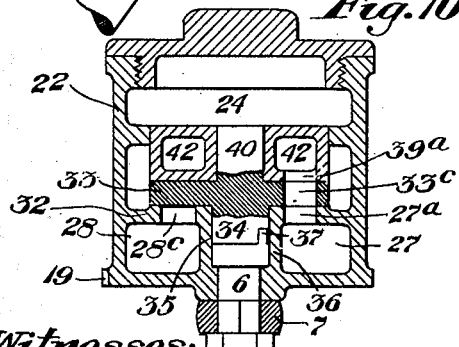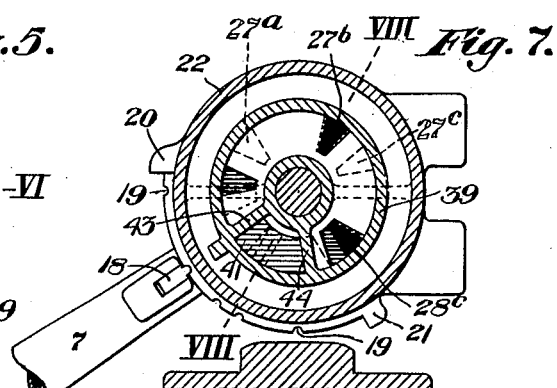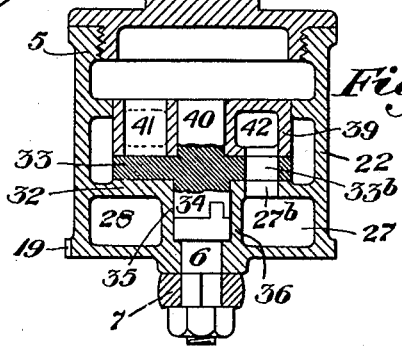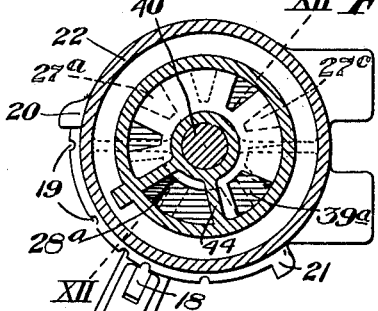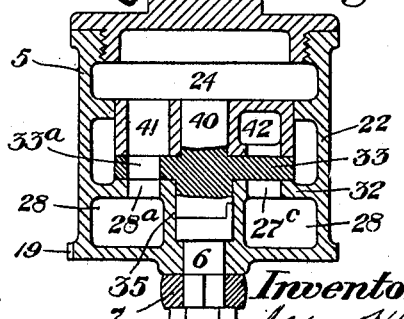

No. 892,148. PATENTED JUNE 30, 1908.
A. H. GELTZ & L. L. HOSACK.
AIR BRAKE APPARATUS.
APPLICATION FILED DEC. 6, 1906.
4 SHEETS—SHEET 4.
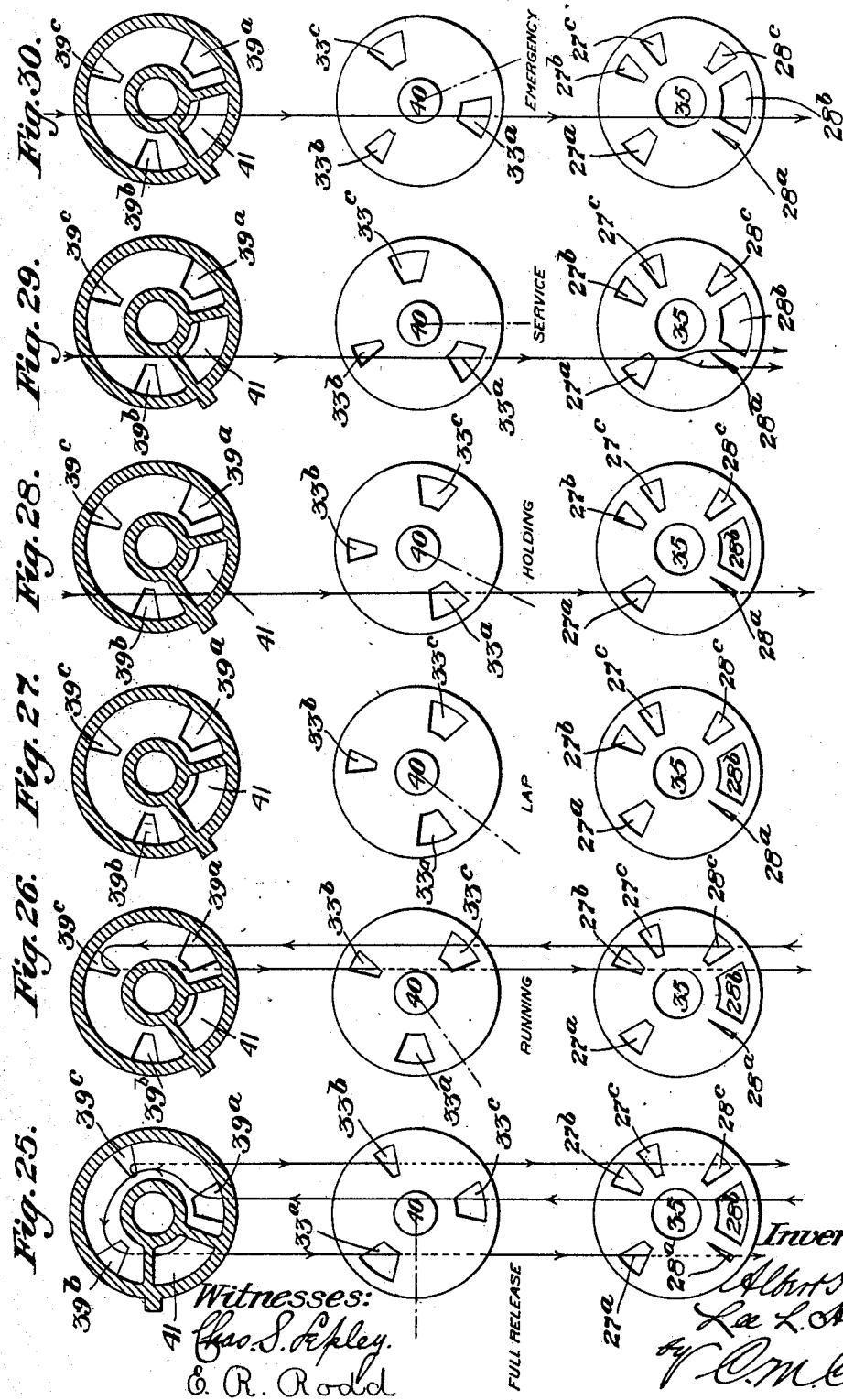

UNITED STATES PATENT OFFICE

ALBERT H. GELTZ, OF ALLIANCE, AND LEE L. HOSACK, OF YOUNGSTOWN, OHIO, ASSIGNORS TO C. B. McLEAN, TRUSTEE, OF PITTSBURG, PENNSYLVANIA.

AIR-BRAKE APPARATUS.

No. 892,148.

Specification of Letters Patent.

Patented June 30, 1908.

Application filed December 6, 1906. Serial No. 346,618.

*To all whom it may concern:*

Be it known that we, ALBERT H. GELTZ and LEE L. HOSACK, citizens of the United States, residing at Alliance and Youngstown, respectively, in the counties of Stark and Mahoning, respectively, and State of Ohio, have invented certain new and useful Improvements in Air-Brake Apparatus, of which the following is a specification, reference being had therein to the accompanying drawing.

Our invention relates to improvements in air brakes, and it has for its object to provide a valve mechanism which will control the locomotive brake cylinder or cylinders independent of the usual locomotive engineer's valve and the train pipe system, including the triple valve, but which will also coöperate with the locomotive engineer's valve at all times, by the manipulation of a single handle.

The objects of the invention are to provide a simple, effective device whereby the locomotive brake cylinder or cylinders may be applied independently or in conjunction with the train brake cylinders, and constitutes an improvement in that class of apparatus shown and described in our former joint application filed April 1st, 1905 bearing the Ser. No. 253,341. In said prior invention, the "straight air" valve is incorporated and operates in conjunction with the usual triple valve, and one of the objects of the present construction is to provide mechanism which will perform all of its necessary functions entirely independent of any connection with the triple valve or of the other parts of the usual system, but which may be operated in conjunction therewith as stated.

The device is designed to exhaust pressure from the locomotive brake cylinder or cylinders without disturbing the train brakes and also to re-apply the locomotive brakes by admission of air to the cylinders thereon without interfering with the ordinary operation of the train brakes. Also to provide for the release of the train brakes entirely independent of the locomotive brakes while said brakes are maintained applied. Also to provide for the application of the locomotive brakes while the train brakes are in release position. Also to provide for the maintaining of the pressure in the locomotive brake cylinders in "lap" position of the engineer's valve, retaining the locomotive brakes set while the train brakes are being released, and for providing for the release of the train brakes in "running" position in the ordinary way. Also to provide for the release of the train brakes while maintaining the locomotive brakes set. Also to release both train brakes and locomotive brakes simultaneously, and to perform said various operations by means of the single handle of our improved mechanism, arranged to coöperate with the locomotive engineer's valve, and to perform its various functions independent of any coöperation therewith, as shall be more fully hereinafter described.

Referring to the drawings: Figure 1. is a diagrammatic view of a portion of the locomotive equipment, illustrating the embodiment therewith of our invention. Fig. 2. is a detail view showing a modified construction providing for a source of pressure independent of the main reservoir. Fig. 3. is an enlarged plan view of our improved valve. Fig. 4. is a vertical sectional view through the handle of said valve on the line IV. IV. of Fig. 3, and showing portions of the connected mechanism. Fig. 5. is an enlarged horizontal cross sectional view on the line V. V. of Fig. 1, showing the valve in "full release" position. Fig. 6. is a vertical sectional view on the line VI. VI. of Fig. 5. Fig. 7. is a view similar to Fig. 5 showing the valve in "running" position. Fig. 8. is a vertical sectional view on the line VIII. VIII. of Fig. 7. Fig. 9. is a view similar to Fig. 5 showing the valve in "lap" position. Fig. 10. is a vertical sectional view on the line X. X. of Fig. 9. Fig. 11. is a view similar to Fig. 5 showing the valve in "holding" position. Fig. 12. is a vertical sectional view on the line XII. XII. of Fig. 11. Fig. 13. is a view similar to Fig. 5 showing the valve in "service" position. Fig. 14. is a similar view showing the valve in "emergency" position. Figs. 15, 16, 17 and 18 are horizontal sectional views of the valve, in "full release" position, indicated by the several section lines XV. XV., XVI. XVI., XVII. XVII. and XVIII. XVIII. respectively of Fig. 6. Fig. 19. is a perspective detail view of the upper frictionally-rotated abutment - controlled air - admission valve. Fig. 20. is a similar view of the lower positively-actuated valve located between said upper valve and the lower seat of the casing and illustrating its various circulation ports. Fig. 21. is a similar view of said valve on the upper side. Fig. 22. is a horizontal sectional view on the line XXII. XXII. of Fig. 4. Fig. 23. is a cross sectional detail view on the line XXIII. XXIII. of Fig. 4. Fig. 24. is a partial vertical section similar to Fig. 6 but showing a modified construction. Figs. 25 to 30 inclusive are diagrammatic views of the compound valves assembled in their various positions relative to each other and to the lower ported valve face.

In the drawings 2 is the main reservoir of the system to which air is supplied from the pump in the usual way and from which it is delivered by main reservoir pipe 3 to the locomotive engineer's valve 4.

5 is our improved "straight air" valve comprising an outer casing having the interior valve and port construction hereinafter described, provided with a downwardly extending stem 6 which projects upwardly into the interior of the valve and engages the lower projecting stud of the positively rotated intervening valve, to which stem 6 is rigidly secured the handle 7, adapted to rotate said valve and to be positioned for the various operations stated. Said handle is so designed that it will make interlocking engagement with an upwardly extending shell 8 of the engineer's valve 4, which shell is secured upon the upper end of the stem of the engineer's valve in the same manner as is the usual operating handle thereon.

The shell 8 is provided with a locking socket 9 into which projects the cylindrical bolt 10 mounted for longitudinal movement in the center of handle 7, or in any other suitable manner, and so arranged that it may be withdrawn backwardly by supplemental extension 11 of the handle, having a longitudinally sliding rotatable engagement therewith, and connected to bolt 10 by an intervening rod 12.

Bolt 10 is normally thrust inwardly by means of a spring 13 mounted in a suitable recess as shown surrounding said stem 12, while the forward portion of supplemental handle 11 is reduced, as at 14, and projects inwardly into a suitable socket in the outer end of the main handle 7 as clearly shown in Fig. 4.

15 is a pin projecting outwardly from handle 11, or its reduced extension 14, adapted to engage a longitudinal slot 16 in the side of the main handle to prevent relative rotation of the supplemental handle until said supplemental handle is withdrawn backwardly to withdraw bolt 10, whereupon the supplemental handle may be rotated to bring pin 15 into register with a recess 17 in the end of handle 7 so that the bolt 10 may be held permanently re-tracted when desired.

By this construction it will be seen that the handle may be used to actuate both the engineer's valve 4 and the moving parts of our improved valve 5, or may be entirely disconnected from shell 8, leaving the engineer's valve inactive, while providing for free operation of the "straight air" valve 5; or that both valves may be actuated to any desired position, after which the handle may be disconnected from the engineer's valve shell 8, leaving the engineer's valve in any desired position and permitting further independent operation of the "straight air" valve.

In order to position handle 7 with relation to the straight air valve, it is provided with the customary spring-pressed abutment 18 arranged to engage each one of a series of the usual notches 19 in the periphery of the lower portion of the "straight air" valve, as will be clearly understood, while the said valve is also provided with limiting abutments 20 and 21 so arranged as to limit the operation of the handle in "full release" position and in "emergency" position respectively, defining the limits of travel.

The casing 22 of valve 5 is provided at its upper portion with a connection 23 by which air pressure is established to the interior chamber 24 at all times by pipe 25 leading from main reservoir 2 as in Fig. 1, through the usual reducing valve if desired, or by pipe 25' from any auxiliary reservoir or other source of fluid under pressure, as indicated in Fig. 2. It will be understood that we do not desire to confine ourselves to the use of main reservoir pressure, and that pressure from any source of supply may be utilized.

The lower portion of casing 22 is divided by a transverse wall 26 into oppositely arranged chambers 27 and 28 respectively (Fig. 18), chamber 27 communicating by port 29 to the atmosphere, either directly or through any suitable pipe connection, while chamber 28 communicates by connection 30 and pipe 31 with the locomotive brake cylinders and tender brake cylinder, either or both, as clearly shown in the diagram, Fig. 1. Above chamber 27 and 28 is a horizontal partition 32 having the various ports $27^a$, $27^b$, and $27^c$ communicating with chamber 27, and $28^a$, $28^b$ and $28^c$ communicating with chamber 28 respectively, as shown in Fig. 17.

Rotatably mounted upon the upper valve face of said partition 32 is the positively actuated intermediate disk valve 33 having the perforating ports $33^a$, $33^b$ and $33^c$ respectively. Said valve is provided with a downwardly extending central stem 34 fitting into a corresponding receiving socket 35 formed within a hub 36 in the casing at its central portion as shown in Fig. 18, into which extends upwardly the valve stem 6 with which handle 7 is connected. Said stems 6 and 34 are provided, one with projecting tongue 37, and the other with a receiving socket 38 respectively, it being immaterial as to which stem is provided with the socket, so that they will make interfitting rotating engagement with each other. An important feature of said engagement is that the socket and projection or key should be of such shape or conformation, as by the tapered construction shown or in any other suitable manner, so that interlocking engagement can only be established between them in one position. By this means assemblage of the parts is facilitated and improper connection positively prevented.

39 is the frictionally-rotated abutment-controlled air-admission valve, seated upon the top of disk valve 33, which valve is preferably provided with an upwardly extending stud or stem 40 for centralizing the valve 39, it being understood that the meeting faces of valves 33 and 39 are ground to make an air tight fit, as is also the under face of valve 33 and the upper face of partition 32, in the manner usually practiced in the construction of such valves. Valve 39 is provided with a single perforating main port 41 for passage of "straight air" directly from chamber 24, its interior circumferential body portion comprising a continuous annular cavity 42 extending entirely around from vertical wall 43 at one end of air port 41 to a similar vertical wall 44 at the other end of said air port 41. The purpose of said cavity 42 is to provide for circulation of exhaust air from the locomotive brake cylinder to the atmosphere in "full release" and "running" positions of valves 33 and 39, upwardly through valve 33 from locomotive brake cylinder through chamber 28 into said chamber 42 and downwardly therefrom again through said valve 33 and through chamber 27 to the atmosphere. The lower wall or bottom portion of said valve 39 is provided with the ports $39^a$, $39^b$ and $39^c$ respectively, as clearly shown in Figs. 5 and 19.

The various ports $28^a$, $28^b$ and $28^c$ and $27^a$, $27^b$ and $27^c$ being stationary, are so arranged with relation to the movable ports $33^a$, $33^b$ and $33^c$ of valve 33, (having the full movement of its stem) and ports $39^a$, $39^b$ and $39^c$ of valve 39, (having partial frictional movement) that communication will be established therethrough or cut off as desired at the various positions of the valves, in order that each may carry out its separate desired functions, and that both may coöperate.

As stated, valve 39 has but a limited movement due to the frictional engagement with it underneath of positively actuated valve 33, and for limiting this travel, it is provided with an abutment 45 adapted in one position to make limiting engagement with the shoulder or corresponding abutment 46 and in the other position to engage with similar shoulder 47, formed in the interior of the casing at the terminals of an intervening clearance space, as clearly shown.

*Full release.*—As thus constructed, when the assembled valves 33 and $39^c$ are in "full release" position (Fig. 5) communication from the brake cylinder is established through chamber 28, ports $28^b$, $33^c$, $39^a$, chamber 42, ports $39^b$ and $39^c$, ports $33^a$ and $33^b$, $27^a$ and $27^c$, and chamber 27, to the atmosphere.

*Running.*—In the next or "running" position to which both valves are moved together (Fig. 7) communication is similarly established from the brake cylinder through chamber 28, port $28^c$, port $33^c$, port $39^a$, chamber 42, port $39^c$, port $33^b$, port $27^b$ and chamber 27 to the atmosphere.

*Lap.*—Abutment 45 having come into contact with shoulder 47, upper valve 39 cannot be farther rotated, and for the next or "lap" position (Fig. 9) valve 33 is independently rotated beneath valve 39, in which position circulation from the brake cylinder to the atmosphere is closed, all ports being blank, although communication from chamber 28 upwardly through ports $28^c$, $33^c$ and $39^a$ to chamber 42 will be established, but no further, by reason of port $39^c$ and the other outlet ports lapping over port $33^b$.

*Holding.*—In the next or "holding" position to which valve 33 is independently moved (Fig. 11) it is designed that a small amount of air shall pass to the brake cylinder to hold it applied, such communication being established downwardly from chamber 24 through port 41, port $33^a$, port $28^a$ to chamber 28, and by pipe 31 to the brake cylinder.

*Service.*—In the next or "service" position, to which valve 33 is independently moved, and in which the service application of the locomotive brakes is made (Fig. 13), straight air passes from chamber 24 downwardly through port 41, port $33^a$, ports $28^a$ and $28^b$ and chamber 28 likewise, and thence to the brake cylinder, the exhaust ports being kept closed as shown, a portion only of the area of port $28^b$ being utilized, but an ample opening being provided for an ordinary "service" application of the brakes.

*Emergency.*—In the next or "emergency" position, for full and immediate application of straight air to the locomotive brake cylinder, (Fig. 14) straight air passes downwardly from chamber 24 through port 41, full area of port $33^a$, port $28^b$ and through chamber 28 to the brake cylinder, the exhaust to the atmosphere being likewise kept closed. When handle 7 by bolt 10 is maintained in engagement with shell 8 of the locomotive engineer's valve during the several before-recited operations, the same several corresponding functions will be performed by the engineer's valve in the order given, our improved valve corresponding to the usual adopted positions of said valve. When, however, it is desired to release the train brakes and maintain the locomotive brakes applied, the engineer's valve is thrown to "running" position, valve 33 reversing upper valve 39 back to "full release", abutment 45 striking shoulder 46, bolt 10 is withdrawn and valve 33 is located at "lap" position, thereby maintaining the pressure on the locomotive brake cylinders quite independent of the train brakes. If desired, valve 33 may also be moved over to "holding" position to renew pressure to the locomotive brake cylinders, due to leakage during such momentary reversal. On the other hand, when it is desired to release the locomotive brakes and to maintain the train brakes set, the locomotive engineer's valve is left in either "lap" or "holding" position by detaching bolt 10 in the same way and immediately throwing our improved valve to "full release" position. It will be obvious also that various other positions may be assumed by either valve or by both by merely manipulating the handle, and the device is thus capable of the greatest elasticity of operation and of the application or release of air within ready control of the operator by the single handle as to either the train brakes or the locomotive brakes, according to whatever contingencies may arise in the operation of the locomotive and train.

By this construction it will be seen that our improved valve is capable of accomplishing the various functions above referred to entirely independent and regardless of the ordinary triple valve or other parts, so that we are able to set and release the locomotive brakes at any time through said valve or by combining it with the ordinary automatic operation. Thus, we may release the locomotive brakes with straight air and re-set with straight air at any time without interfering with or using the automatic valve, while still providing for the full, complete application of the train brakes and the locomotive brakes by the simultaneous operation of both valves.

A particular advantage of the independent operation of the locomotove brakes is that in case of "skidding" or sliding of the locomotive wheels, tending to cause flattening thereof, the brakes may be released and instantly re-applied and take a new hold and pressure may be likewise retained on the locomotive brakes independently of the train brakes, as has been stated.

In Fig. 24 we show a modified construction in which stem 40 may be extended above the upper face of valve 39, as indicated at 48 and provided with a retaining nut 49 to prevent entire disengagement of valves 33 and 39. The advantage of such construction is that both valves may be lifted entirely out of the case and replaced without danger of being improperly re-assembled, i. e. replacing valve 29 upside down. Also, a spring 50 may be inserted between the cover of the casing and top of valve 39 to increase its frictional engagement with valve 33, although ordinarily the air pressure will be quite sufficient.

The advantages of our invention will be fully appreciated by all those familiar with air brake construction or practice, as it places the engineer in control of the locomotive brakes entirely independent of the train system or in combination therewith, while the various advantages incident to the operation of the system as a whole are present with undiminished efficiency.

Various changes or modifications may be made in the construction of the valve as to the air ports, their arrangement or design, as well as the manner of incorporating the valve in the system, the construction of the detachable compound operating handle, or in various other features or details, but all such changes are to be considered as within the scope of the following claims.

What we claim is:—

1. The combination with an engineer's valve, a reservoir, and a brake cylinder; of an independent valve arranged to establish communication between the reservoir and the brake cylinder and having an element adapted to actuate the engineer's valve.

2. The combination with an engineer's valve, a reservoir, and a brake cylinder; of an independent valve arranged to establish communication between the reservoir and the brake cylinder and having an operating handle adapted to engage and actuate the engineer's valve.

3. The combination with an engineer's valve, a reservoir, and a brake cylinder; of an independent valve arranged to establish communication between the reservoir and the brake cylinder and having a handle adapted to be operatively connected to or disconnected from the engineer's valve.

4. The combination with an engineer's valve, a reservoir, and a brake cylinder, of an independent valve arranged to establish communication between the reservoir and the brake cylinder and having an operating handle adapted to engage and actuate the engineer's valve, and to locate said valve in positions corresponding to the positions of the independent valve.

5. The combination with a reservoir and a brake cylinder, of compound valve mechanism connected to the reservoir and brake cylinder respectively, and having ported valves arranged to establish direct communication between the reservoir and brake cylinder and from the brake cylinder to the atmosphere, one of said valves being operable by the other.

6. The combination with a reservoir and a brake cylinder, of valve mechanism having ports communicating with the brake cylinder and atmosphere respectively, and provided with a plurality of co-acting valves arranged to establish communication from the reservoir to the brake cylinder and from the brake cylinder to the atmosphere respectively, one of said valves being operable by the other.

7. The combination with a reservoir and a brake cylinder, of valve mechanism having ports communicating with the brake cylinder and atmosphere respectively, and provided with a plurality of co-acting valves arranged to establish communication from the reservoir to the brake cylinder and from the brake cylinder to the atmosphere respectively, or to close both communications, one of said valves being operable by the other.

8. The combination with a reservoir and a brake cylinder, of valve mechanism having ports communicating with the brake cylinder and atmosphere respectively, and having disk valves provided with coöperating ports arranged by the manipulation of a single handle to establish communication from the reservoir to the brake cylinder or from the brake cylinder to the atmosphere.

9. The combination with a reservoir and a brake cylinder, of valve mechanism having ports communicating with the brake cylinder and atmosphere respectively, and having disk valves provided with coöperating ports arranged by the manipulation of a single handle to establish communication from the reservoir to the brake cylinder or from the brake cylinder to the atmosphere, or to close such communication.

10. Valve mechanism having ports adapted to communicate with a brake cylinder and with the atmosphere respectively, and with a source of pressure; and a plurality of valves having ports arranged to coöperate with said ports, one of said valves being operable by the other.

11. Valve mechanism having ports adapted to communicate with a brake cylinder and with the atmosphere respectively, and with a source of pressure; and a plurality of valves having ports arranged to establish communication from the source of pressure to the brake cylinder and from the brake cylinder to the atmosphere, one of said valves being operable by the other.

12. Valve mechanism having ports adapted to communicate with a brake cylinder and with the atmosphere respectively, and with a source of pressure; and a positively actuated and a frictionally actuated valve having ports arranged to coöperate with said ports.

13. Valve mechanism having ports adapted to communicate with a brake cylinder and with the atmosphere respectively, and with a source of pressure; and a positively actuated and a frictionally actuated valve having ports arranged to coöperate with said ports, with a spring arranged to press one valve against the other.

14. Valve mechanism having ports adapted to communicate with a brake cylinder and with the atmosphere respectively, and with a source of pressure; and a positively actuated and a frictionally actuated valve having ports arranged to coöperate with said ports, with means adapted to hold said valves in assembled relation to each other.

15. Valve mechanism having ports adapted to communicate with a brake cylinder and with the atmosphere respectively, and with a source of pressure; a positively actuated and a frictionally actuated valve having ports arranged to coöperate with said ports, and an operating handle adapted to engage the positively actuated valve.

16. Valve mechanism having ports adapted to communicate with a brake cylinder and with the atmosphere respectively, and with a source of pressure; a positively actuated and a frictionally actuated valve having ports arranged to coöperate with said ports, and an operating handle adapted to engage the positively actuated valve in one position only.

17. Valve mechanism having ports adapted to communicate with a brake cylinder and with the atmosphere respectively, and with a source of pressure; a positively actuated and a frictionally actuated valve having ports arranged to coöperate with said ports, and an operating handle adapted to engage the positively actuated valve, and provided with an adjustable locking bolt.

18. Valve mechanism having ports adapted to communicate with a brake cylinder and with the atmosphere respectively, and with a source of pressure; a positively actuated and a frictionally actuated valve having ports arranged to coöperate with said ports, and an operating handle adapted to engage the positively actuated valve, and provided with a spring pressed adjustable locking bolt.

19. Valve mechanism having ports adapted to communicate with a brake cylinder and with the atmosphere respectively, and with a source of pressure; a positively actuated and a frictionally actuated valve having ports arranged to coöperate with said ports, and an operating handle adapted to engage the positively actuated valve, and provided with a spring pressed adjustable locking bolt and means for holding said bolt retracted.

20. The combination with a locomotive engineer's valve having an actuating portion, of an independent straight air valve provided with a handle arranged to be connected with or disconnected from said actuating portion.

In testimony whereof we affix our signatures in presence of two witnesses.

ALBERT H. GELTZ.
LEE L. HOSACK.

Witnesses:
 CHAS. S. LEPLEY,
 C. M. CLARKE.